(12) United States Patent
Holmstrom et al.

(10) Patent No.: US 9,291,242 B2
(45) Date of Patent: Mar. 22, 2016

(54) DEPENDENCY TRANSMISSION

(71) Applicant: VOLVO CAR CORPORATION, Gothenburg (SE)

(72) Inventors: Jan Christian Holmstrom, Gothenburg (SE); Fredrik Henningsson, Lodose (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/532,464

(22) Filed: Nov. 4, 2014

(65) Prior Publication Data

US 2015/0135875 A1    May 21, 2015

(30) Foreign Application Priority Data

Nov. 15, 2013    (EP) .................................. 13193123

(51) Int. Cl.
| F16H 1/22 | (2006.01) |
| F16H 55/08 | (2006.01) |
| F16H 1/20 | (2006.01) |
| F16H 3/08 | (2006.01) |

(52) U.S. Cl.
CPC ................ F16H 1/22 (2013.01); F16H 1/206 (2013.01); F16H 55/08 (2013.01); F16H 2003/0803 (2013.01); Y10T 74/19642 (2015.01)

(58) Field of Classification Search
CPC ........... F16H 1/22; F16H 1/227; F16H 55/08; F16H 2055/0893
See application file for complete search history.

(56) References Cited

U.S. PATENT DOCUMENTS

| 1,357,674 | A | * | 11/1920 | Alquist | 74/410 |
| 1,383,706 | A | * | 7/1921 | Farnum | 74/410 |
| 1,551,565 | A | * | 9/1925 | Hodgekinson | 74/410 |
| 2009/0272211 | A1 | | 11/2009 | Hoffmann et al. | |
| 2010/0062895 | A1 | * | 3/2010 | Brouwer | 475/331 |

FOREIGN PATENT DOCUMENTS

| EP | 2123941 A1 | 11/2009 |
| WO | 2013138941 A1 | 9/2013 |

OTHER PUBLICATIONS

Extended European Search Report Dated May 9, 2014, Application No. 13193123.0-1752, Applicant Volvo Car Corporation, 4 Pages.

* cited by examiner

*Primary Examiner* — Terence Boes
(74) *Attorney, Agent, or Firm* — Brooks Kushman P.C.

(57) ABSTRACT

The disclosure relates to a transmission for a motor vehicle, wherein the transmission comprises an input shaft, at least first and second countershafts, and an output shaft. The input shaft is provided with a first driving gearwheel, which interacts with a first gearwheel arranged upon the first countershaft, and a second gearwheel arranged upon the second countershaft. A number of gear teeth of the first gearwheel is selected such that, in relation to the number of gear teeth of the first driving gearwheel, the number of gear teeth of the first gearwheel can be either reduced or increased with at least one gear tooth, without affecting the number of gear teeth upon the first driving gearwheel, whereby the reduction or increase in the number of gear teeth of the first gearwheel is compensated with a profile shift of the gear teeth of the first gearwheel.

18 Claims, 4 Drawing Sheets

DEPENDENCY TRANSMISSION

CROSS-REFERENCE TO RELATED APPLICATIONS

This application claims foreign priority benefits under 35 U.S.C. §119(a)-(d) to European patent application number EP 13193123.0, filed Nov. 15, 2013, which is incorporated by reference in its entirety.

TECHNICAL FIELD

The disclosure relates to a transmission for a motor vehicle and especially a transmission with dependent gear steps.

BACKGROUND

There are several types of transmission used in vehicles. Transmissions provided with one input shaft driving a first or a second countershaft can have an independent or a dependent layout. In a transmission with an independent layout, all the driven gearwheels upon the countershafts are driven by a driving gearwheel upon the input shaft, which driving gearwheel does not drive any driven gearwheel upon the other counter shaft. The input shaft must accommodate the sum of all driven gearwheels upon the countershafts. Consequently a transmission with an independent layout is often bulky and heavy, and there is thus a need to improve the solution in terms of size and weight.

In independent transmissions where each gear corresponds to a separate gearwheel set, with a gearwheel arranged upon the countershaft and a driving gearwheel arranged upon the input shaft, the ratio of the gearwheel set is easily adapted by changing one of the gearwheels of the set to a different size. The ratio of the gearwheel set determines the outgoing torque of the gear, which may be adapted depending on the engine etc. Hence, the most common transmission solution is flexible in terms of changing the ratio of the individual gears but bulky and heavy.

The transmissions described above are bulky, and other solutions are thus sought. In order to make possible a transmission of less size and weight the transmission may utilize dependent gears. In dependent gears two gearwheels of two countershafts are both interacting with one common driving gearwheel arranged upon the input shaft. Likewise, two output gearwheels may interact with a common final drive gearwheel. Thereby, fewer driving gearwheels are needed and the dependent transmissions may be made compacter than independent transmissions. Commonly in dependent transmissions the choice of gearwheel sets are restricted by the geometry of the driving gearwheel of the input shaft, the gearwheels of the countershafts and the output gearwheel of the output shaft as these are all dependent on each other. In order to change the ratio of one gearwheel set, comprising a first gearwheel arranged on the first countershaft and a driving gearwheel on the input shaft, the second gearwheel on the second countershaft which is interacting with the same driving gearwheel must consequently be adapted to the change as well. Therefore, dependent transmissions are less flexible than an independent transmission.

SUMMARY

An object of the disclosure is to suggest a transmission with an input shaft, which has at least two countershafts in drive connection with it, wherein the input shaft is provided with at least one driving gearwheel which is in driving connection with a gearwheel upon both countershafts and still enables a high flexibility in the selection of gear layout.

The transmission comprises an input shaft, an output shaft and at least a first and second countershaft. The input shaft is provided with a first driving gearwheel, which interacts with both a first gearwheel arranged upon the first countershaft, and a second gearwheel arranged upon the second countershaft.

The first and second countershaft is further provided with a first and second output gearwheel respectively, which interacts with a common final drive gearwheel arranged upon the output shaft. Hence, a torque can be transmitted from the input shaft to the output shaft over the driving gearwheel, the first gearwheel, the first output gearwheel and the final drive gearwheel or the driving gearwheel, the second gearwheel, the second countershaft, the second output gearwheel and the final drive gearwheel. Which one of the paths that are used is dependent of the engagement and disengagement of clutches arranged upon the first and second countershaft, i.e., which gear is in use.

By arranging several gearwheels to be dependent on a common driving wheel and several output gearwheels to be dependent on a common final drive gearwheel an axial compact transmission can be built. This is thus space and weight saving.

According to the disclosure the number of gear teeth of the first gearwheel is selected such that, in relation to the number of gear teeth of the first driving gearwheel, the number of gear teeth of the first gearwheel can be either reduced or increased with at least one gear tooth, without affecting the number of gear teeth upon the first driving gearwheel. The reduction or increase of the number of gear teeth of the first gearwheel is compensated with a profile shift of the gear teeth of the first gearwheel. The profile shift allows the reduction or increase of the number of gear teeth of the first gearwheel without disrupting the interaction with the first driving gear wheel. Hence, the ratio between the driving gearwheel and the first gearwheel may be changed by the number of teeth without changing the diameter of the first gear wheel or the driving gearwheel. This allows the gearwheel set ratio between the first driving gear and the second gearwheel to be maintained, because the change in number of gear teeth of the first gearwheel does not affect the number of gear teeth upon the driving gearwheel. Hence, as the driving gearwheel remains the same the second gearwheel does not have to be adapted to a change of the first gearwheel.

Profile shifting of the gearwheels is also called addendum modification.

The transmission allows a freedom in choice of the gear ratio for the gear using the gear step between the driving gearwheel and the first gearwheel upon the first countershaft, without affecting the gear ratio of another gear, which also uses the driving gearwheel. A more flexible dependency transmission may thus be provided.

By using profile shifting of the gear teeth a transmission with maintained flexibility to adapt the gear ratios, of the different gears of the transmission, to the vehicle is facilitated.

Further advantages in flexibility are achieved by adapting the same methodology to the gear step between the first countershaft and the output shaft.

A change in the number of gear teeth of the first output gearwheel will affect other gears places on the same countershaft. This may not necessarily lead to that the gearwheels of the other gears have to be changed. In one aspect of the disclosure first and second rotational axes of the first and second countershafts, respectively, are arranged at first and second predetermined distances, respectively, from a rotational axis of the input shaft. By providing the teeth of the first gearwheel with a profile shift, the number of teeth on the first gearwheel may be changed in order to change the ratio of the first gearwheel and the driving gearwheel even at a predetermined distance between the rotational axes i.e., when the diameter of the gearwheels of the set are predetermined. If several gearwheels are arranged upon the first countershaft, each gearwheel corresponding to a different gear set representing a different gear, then it is an advantage to be able to change the ratio of a gearwheel set without changing the distance between the rotational axes of the two gearwheels as this would affect the other gearwheels arranged upon the same countershaft. Hence, only one gearwheel set out of several arranged on the countershaft may be changed if profile shifting is used. This facilitates a freedom to choose gear sets irrespective of each other, thus the flexibility of the transmission is increased.

By arranging the shafts at predetermined distances from each other the dependency transmission set up may be used as a standard for several different vehicles. The different vehicles may require different transmission set ups, e.g., the sought after effect of a gearwheel set, a gear, may differ between different vehicle types depending on the engine used, the intended acceleration and drive feeling etc. The sought after effect is easily attained by adjusting the number of teeth on the corresponding gearwheel, and compensated by profile shifting. Thereby, the entire transmission set up does not need to be adapted, but only the gearwheel of the gearwheel set in mind is changed. The transmission is thus flexible and easily adjusted to fit the different requirements of various vehicles.

The number of gear teeth upon the first output gearwheel may be selected such that, in relation to a number of gear teeth upon the final drive gearwheel, the number of gear teeth of the first output gearwheel can be reduced or increased with at least one gear tooth without affecting the number of gear teeth upon the final drive gearwheel. The reduction or increase of the number of gear teeth of the first output gearwheel is compensated with a profile shift of the gear teeth of the first output gearwheel. Thereby, the ratio between the first output gearwheel and the final drive gearwheel may be changed by the use of first output gearwheels comprising different number of teeth. Hence, the torque can be changed by changing the number of teeth on the first output gearwheel. Due to profile shifting, the change in gearwheel ratio of the first output gearwheel and the final drive gearwheel may be done without changing the teeth profile or diameter of the final drive gearwheel. Thereby, the second output gearwheel, which also interacts with the final drive gearwheel, is unaffected by the change in ratio of the first output gearwheel and the final drive gearwheel. An effect of this is that the first and second output gearwheels can share one final drive gearwheel instead of using one final drive gearwheel each. Each of the output gearwheels may be changed by profile shifting, affecting the torque of the corresponding gearwheel set, without affecting the other output gearwheel set. This allows greater flexibility and freedom in terms of changing the gearwheel set ration and consequently the performance of that gear.

A dependency transmission, wherein the gearwheel sets use the same final drive gearwheel on the output shaft, can be made with compacter countershafts and output shafts, thus saving space and weight of the transmission.

In combination, a change in number of teeth of the first gearwheel and a change in number of teeth of the first output gearwheel, made possible by a profile shift, allows for great flexibility of the total output effect of the gear sets in a dependency transmission. Normally in a dependency transmission, the gear sets are restricted by the geometry of the gearwheels arranged upon the countershaft. In the disclosure this limitation is overcome by using profile shifting at the first gearwheel and the first output gearwheel. Hence, the number of possible gear sets is increased. Also, the ratio of the gear arranged upon the first countershaft may be changed without affecting the ratio of the gear set arranged upon the second countershaft.

In one aspect of the disclosure the number of gear teeth upon the second gearwheel may be selected such that, in relation to a number of gear teeth upon the first driving gearwheel, the number of gear teeth of the second output gearwheel can be reduced or increased with at least one gear tooth without affecting the number of gear teeth upon the first driving gearwheel. The reduction or increase of the number of gear teeth of the second gearwheel is compensated with a profile shift of the gear teeth of the second gearwheel. Thereby, the gearwheel set may be independently changed without changing the teeth of the first driving gearwheel and without affecting the first gearwheel which is dependent of the first driving wheel. However, the number of teeth upon both the first gearwheel of the first countershaft and the second gearwheel of the second countershaft may be increased or reduced. In order to not affect the interaction with the first driving gearwheel such that the first driving gearwheel must be changed, the teeth of the first as well as the second gearwheel may be compensated with a profile shift such that the teeth may interact with the first driving gearwheel irrespective of the increase or reduction of the number of teeth.

A number of gear teeth upon the second output gearwheel may be selected such that, in relation to a number of gear teeth upon the final drive gearwheel, the number of gear teeth of the second output gearwheel can be reduced or increased with at least one gear tooth without affecting the number of gear teeth upon the final drive gearwheel. The reduction or increase of the number of gear teeth of the second output gearwheel is compensated with a profile shift of the gear teeth of the second output gearwheel. Thus, both the first output gearwheel and the second output gearwheel or both of them may be adjusted by adding or reducing at least one tooth, and the increase or reduction is compensated by a profile shift. In combination with increasing or decreasing the number of teeth on a first or second gearwheel this allows for a great flexibility in terms of setting ratios of different gearwheel sets in order to adapt the gears to different requirements when setting up a transmission.

According to one aspect of the disclosure the input shaft may be provided with at least one further driving gearwheel which is in drive connection with at least one further gearwheel upon the first countershaft. The number of teeth of the further gearwheel upon the first countershaft may be increased or reduced without affecting the number of teeth on the further driving gearwheel by utilizing profile shifting of the teeth of the further gearwheel. Preferably, the rotational center of the input shaft and the rotational center of the countershaft are at a predetermined distance from each other. Hence, profile shifting must be performed on the further gearwheel of the countershaft if the ratio of the gearwheel set is to be changed by increasing or reducing the number of teeth of the further gearwheel without changing the predetermined distance.

The input shaft may also be provided with at least one further driving gearwheel which is in drive connection with at least one further gearwheel upon the second countershaft. By profile shifting, one set of gearwheels upon the second countershaft may be changed without affecting the other sets of gearwheels on the second countershaft.

By providing several gearwheel sets upon the input shaft a complete transmission with gear set up may be provided, with e.g., a transmission with six gears. By using dependency, this transmission may be smaller than independent transmissions.

BRIEF DESCRIPTION OF THE DRAWINGS

The present disclosure will now be described in detail with reference to the drawings, wherein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following two embodiments of the disclosure are shown and described, simply by way of illustration of two modes of carrying out the disclosure. The drawings and the description are to be regarded as illustrative in nature, and not restrictive.

Figure 1:
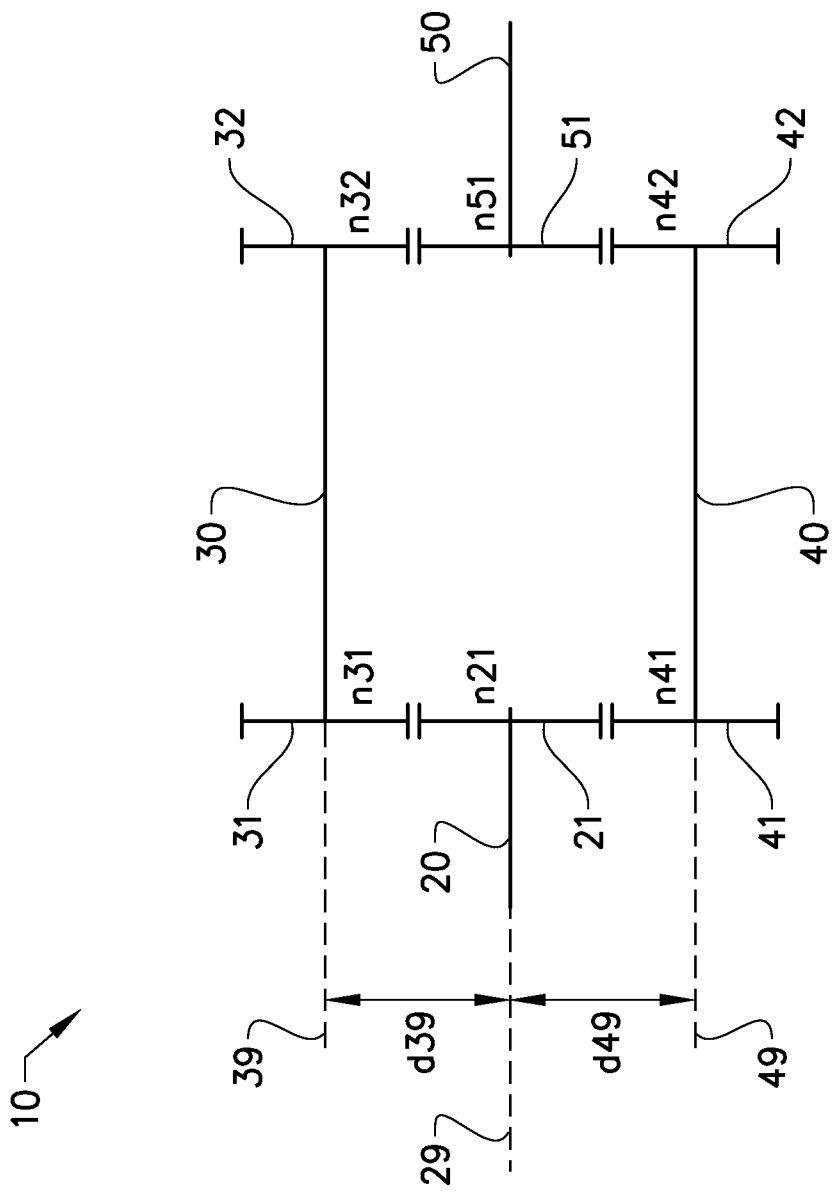
FIG. 1 shows a schematic view of a transmission according to the disclosure.
Figure 2A:
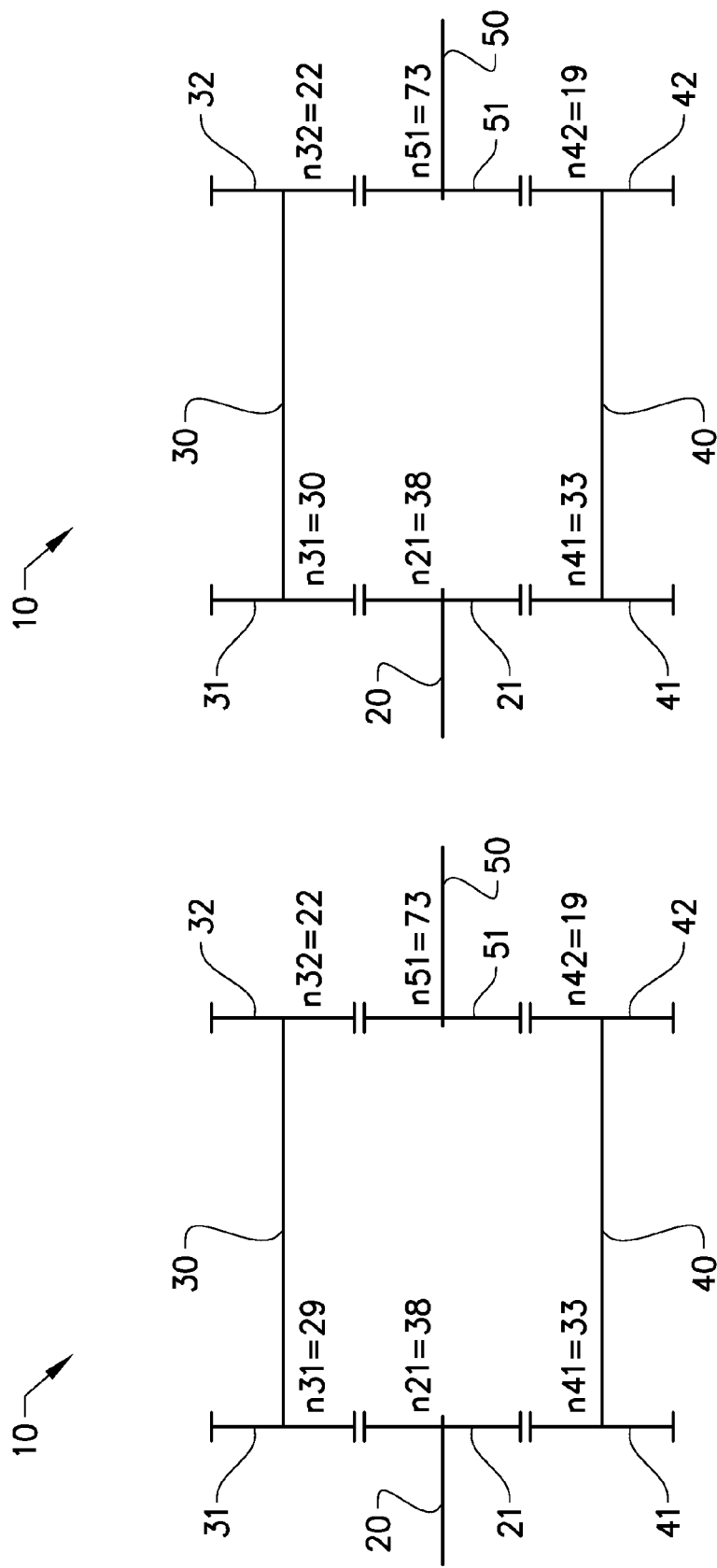
FIG. 2a shows a schematic view of a two gear sets according to the disclosure.
Figure 2B:
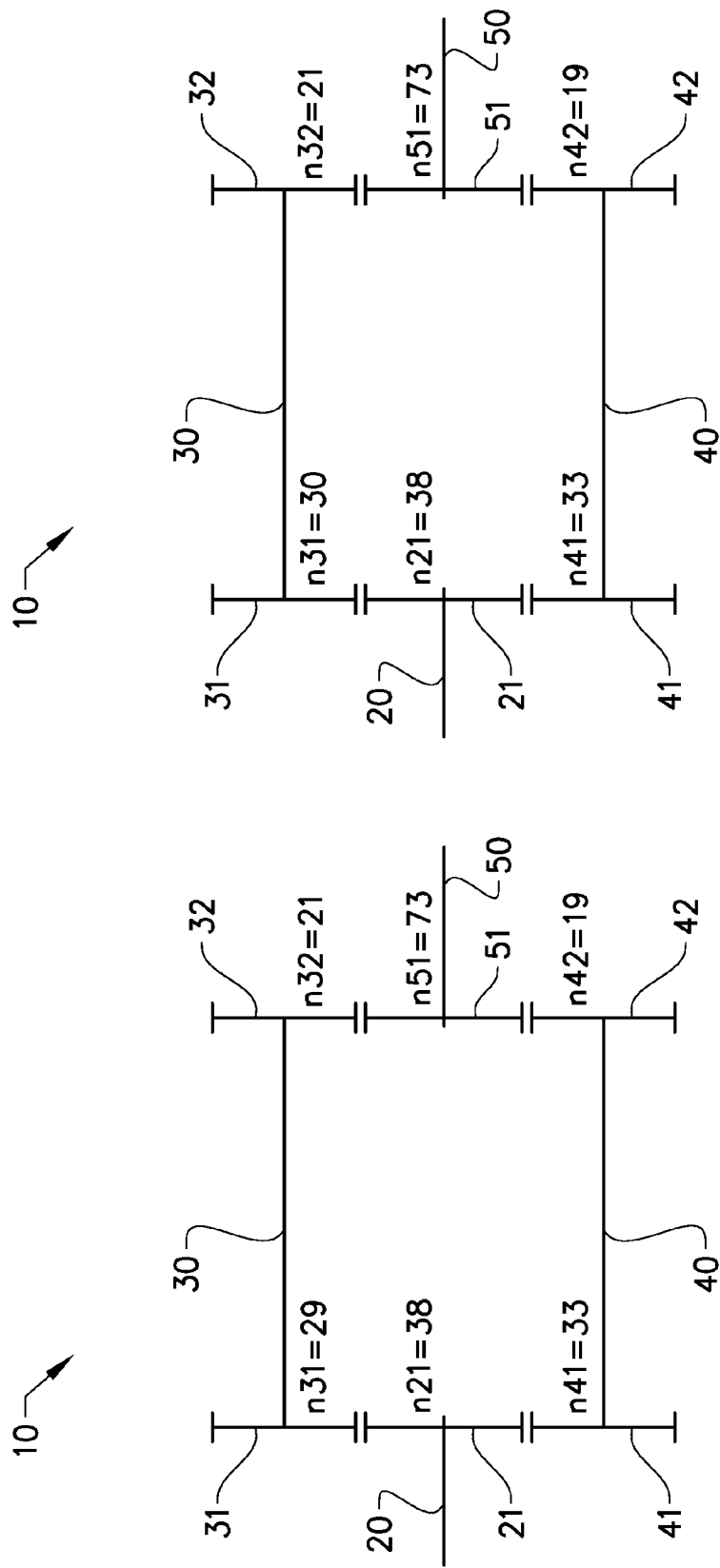
FIG. 2b shows a schematic view of a two gear set according to the disclosure.
Figure 3:
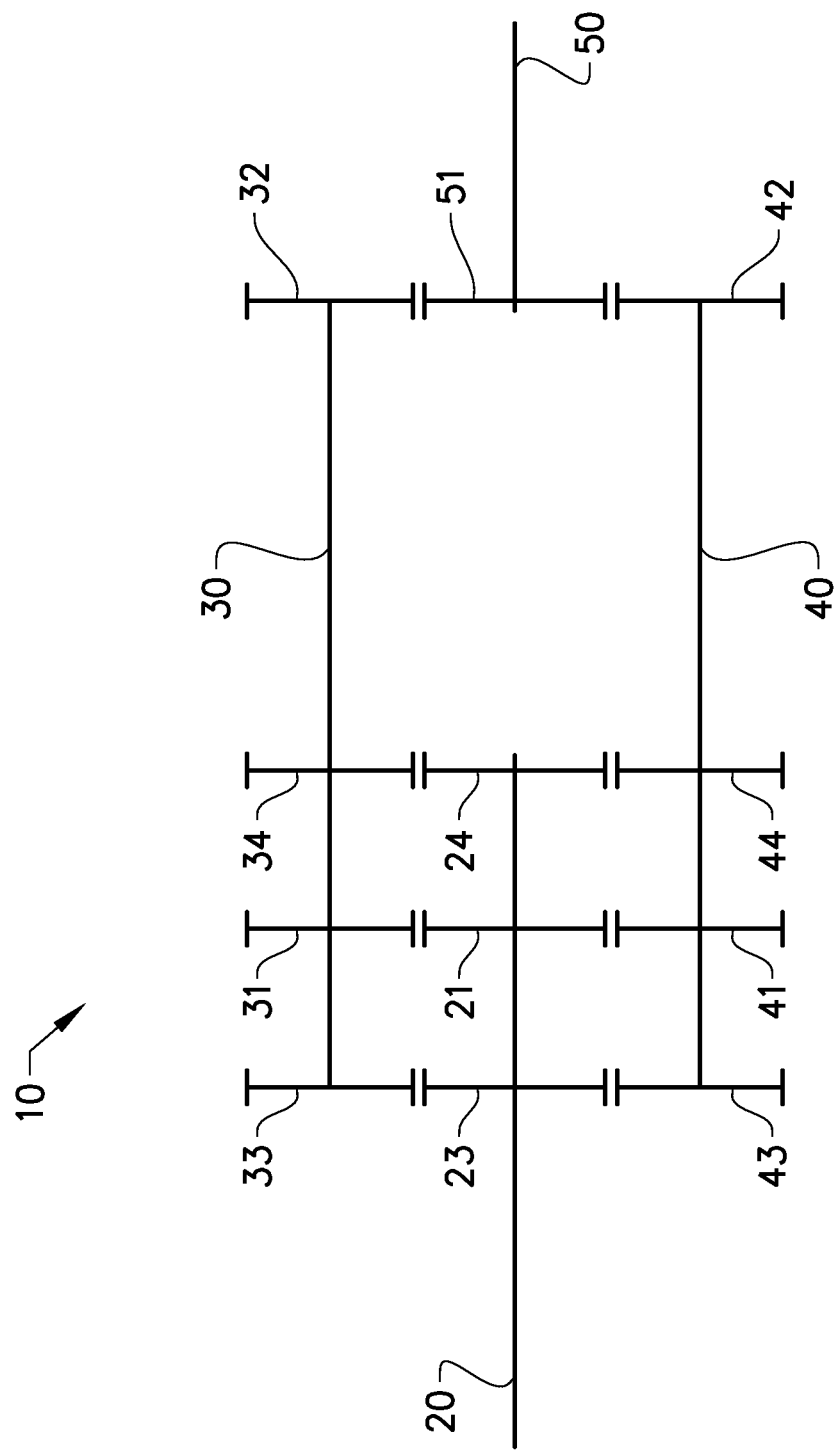
FIG. 3 shows a schematic view of a transmission according to the disclosure.

The transmission is now described in conjunction with FIGS. 1-3. FIG. 1 shows a dependency transmission 10 for a motor vehicle. The transmission 10 comprises an input shaft 20, an output shaft 50, a first countershaft 30 and a second counter shaft 40. A first driving gearwheel 21, provided at the input shaft 20, is arranged to interact with a first gearwheel 31 arranged upon the first countershaft 30 and with a second gearwheel 41 arranged upon the second countershaft 40. Interaction is made when the teeth of the gearwheels are matched together, thus generating a torque when rotating. In order for the momentum/torque provided by the first driving gearwheel 21 to the first gearwheel 31 to be relayed to the drive wheels of the vehicle the first countershaft 30 is further provided with a first output gearwheel 32 which is arranged to interact with a final drive gearwheel 51 arranged upon the output shaft 50. Thereby, the momentum from the first gearwheel set is relayed to the output gearwheel set and the effect of the first gearwheel 31 is received by the output shaft 50. The momentum is transferred from the output shaft to the drive wheels of the vehicle.

In the dependency transmission 10, a first gearwheel 31 and a second gearwheel 41 are arranged to interact with the same driving gearwheel 21. Thereby, only one driving gearwheel 21 is needed per each set of gears, e.g., gear 5 (represented by first gearwheel 31) and gear 4 (represented by second gearwheel 41). In such a setup, space and weight of the transmission may be saved as less driving gearwheels are needed. Hence, this is a beneficial solution. The same applies to the output gearwheels 32, 42 which are both arranged to interact with the final drive gearwheel 51 arranged upon the output shaft 50.

In order to change the outgoing effect of the first set of gearwheels, the ratio between the gearwheels (first gearwheel 31 and first driving gearwheel 21) must be changed. Due to the gear dependency, it is preferably done without affecting the first driving gearwheel 21 as the second gearwheel 41 is also arranged to depend on the first driving wheel 21. Hence, the number of gear teeth n31 of the first gearwheel 31 is selected such that the number of gear teeth n31 can be either reduced or increased with at least one gear tooth, without affecting the number of gears teeth n21 upon the first driving gearwheel 21. The change in number of teeth n31 in order to change the ratio of the gearwheel set is compensated by profile shift of the teeth n31.

The second gearwheel 41 is provided with a number of gear teeth n41. The number of gear teeth n41 is selected in relation to the number of gear teeth n21 upon the first driving gearwheel 21 such that the number n41 may be increased or reduced without affecting the number of gear teeth n21. The change in number of gear teeth n41 is thus compensated by profile shifting.

As shown in FIG. 1, the first output gearwheel 32 is provided with a number of gear teeth n32. The number of gear teeth n32 is selected in relation to a number of gear teeth n51 upon the final drive gearwheel 51 such that the number of gear teeth n32 may be increased or decreased without affecting the number of teeth n51 of the final drive gearwheel 51. In order to compensate for a change in number of gear teeth n32, the teeth n32 are profile shifted.

The second output gearwheel 42 is provided with a number of gear teeth n42. The number of gear teeth n42 is selected in relation to the number of gear teeth n51 upon the final drive gearwheel 51 such that the number of gear teeth n42 may be increased or decreased without affecting the number of teeth n51 of the final drive gearwheel 51. In order to compensate for a change in number of gear teeth n42, the teeth n42 are profile shifted.

The rotational axis 39 of the countershaft 30 is arranged at a predetermined distance d39 from the rotational axis 29 of the input shaft 20. Similarly, the rotational axis of the countershaft 40 is arranged at a predetermined distance d49 from the rotational axis of the input shaft 20. All three axes are parallel to each other. In order to provide a change in effect of the first gearwheel set, the number of teeth n31 is changed and compensated by profile shift such that the predetermined distance d39 is unaffected. Hence, the output gearwheel 32 does not need to be adjusted as a result of change in the first gearwheel 31.

FIG. 2a shows an example of how one gearshift may be tailored to a specific ratio in order to provide a certain output effect. In FIG. 2a, the number of teeth n31 of the first gearwheel 31 is increased from 29 to 30 teeth, whereas the number of teeth n21 of the first driving gearwheel 21 is constant at 38. The increase in the number of gear teeth n31 of the first gearwheel 31 is compensated with a profile shift of the gear teeth of the first gearwheel 31 such that the number of gear teeth n21 of the first driving gearwheel 21 is not affected. The teeth of the first gearwheel 31 and the teeth of the first driving gearwheel 21 still engage each during drive. The outgoing effect, transmitted to the outgoing shaft, is however changed when the number of teeth n31 of the first gearwheel 31 is increased to 30. Two different effects are achieved in FIG. 2a, one prior to the increase in teeth n31 and one after the increase of teeth n31. Less teeth n31 results in a lower gearwheel set ratio.

FIG. 2b shows an example of how a gearshift complementing that of FIG. 2a may be tailored to a specific ratio in order to provide a certain output effect. In FIG. 2b, the number of teeth n32 of the first output gearwheel 32 is decreased from 22, as was the case in FIGS. 2a, to 21 teeth, whereas the number of teeth n51 of the final drive gearwheel 51 is constant at 73. The decrease in the number of gear teeth n32 of the first output gearwheel 32 is compensated with a profile shift of the gear teeth of the first output gearwheel 32 such that the number of gear teeth n51 of the final drive gearwheel 51 is not affected. As in FIG. 2a, the number of teeth n31 of the first gearwheel 31 is increased from 29 to 30 teeth, whereas the number of teeth n21 of the first driving gearwheel 21 is constant at 38. The increase in the number of gear teeth n31 of the first gearwheel 31 is compensated with a profile shift of the gear teeth of the first gearwheel 31 such that the number of gear teeth n21 of the first driving gearwheel 21 is not affected. The teeth of the first gearwheel 31 and the teeth of the first driving gearwheel 21 still engage each during drive. The outgoing effect, transmitted to the outgoing shaft, is however changed when the number of teeth n31 of the first gearwheel 31 is increased to 30. Two different effects are achieved in FIG. 2b, one prior to the increase in teeth n31 and one after the increase of teeth n31. Less teeth n31 results in a lower gearwheel set ratio. The fact that the number of teeth n32 of the first output gearwheel 32 has been reduced means that different gearwheel set ratios are provided in FIG. 2b than in FIG. 2a.

In combination, by increasing or decreasing the number of gear teeth n31 by one tooth of the first gearwheel 31 and increasing or decreasing the number of gear teeth n32 by one tooth of the first output gearwheel 32 the possible gear set ratios is consequently 2*2=4. Hence, a multiplier effect is achieved by using profile shift on the first gearwheel 31 as well as the first output gearwheel 32 of the final drive.

The dependent gear set of the second gearwheel 41 and the second output gearwheel 42 are unchanged in FIG. 2a and FIG. 2b since the first driving gearwheel 21 is not affected by the change in number of gear teeth n31 nor is the final gearwheel 51 affected by the change in number of gear teeth n32. However, the number of teeth n41 of the second gearwheel 41 and the number of teeth n42 of the second output gearwheel 42 may also be changed and compensated by profile shift according to the disclosure. This allows for increased freedom to choose gear sets of different ratios hence a transmission then could be adjusted to fit a variety of requirements.

In FIG. 3, three gearwheels 31, 33, 34 are arranged upon the first countershafts 30 and three gearwheels 41, 43, 44 are arranged upon the second countershaft 40. The input shaft 20 is arranged with corresponding driving gearwheels 21, 23, 24 which interact with two gearwheels each, i.e., six gearwheel sets are seen in FIG. 3. The countershafts 30, 40 interact with a common final drive gearwheel 51 arranged upon an output shaft 50. Each individual gearwheel set, e.g., gear, may be tailored to provide a specific ratio in order to provide a desired effect by changing the number of teeth on the gearwheel 31, 33, 34, 41, 43, 44 of the countershafts 30, 40 of the particular gearwheel set. Profile shift of the teeth allows for the change in number of teeth to be made without affecting the number of teeth on the corresponding driving gearwheel 21, 23, 24. Hence, the dependency transmission is flexible in terms of tailoring the gears to suit different vehicles or engines. As seen in FIG. 3, the dependency transmission is compact in axial direction because each gearwheel 31, 33, 34, 41, 43, 44 does not require a driving gearwheel of its own.

The disclosure is not limited to the specific embodiments presented, but includes all variations within the scope of the present claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission for a motor vehicle, the transmission comprising:
    an input shaft;
    at least first and second countershafts; and
    an output shaft;
    wherein the input shaft is provided with a first driving gearwheel that interacts with:
        a first gearwheel arranged on the first countershaft, and
        a second gearwheel arranged on the second countershaft;
    wherein the first and second countershafts are further provided with first and second output gearwheels, respectively, which interact with a common final drive gearwheel arranged on the output shaft;
    wherein a number of gear teeth of the first gearwheel is selected such that, in relation to a number of gear teeth of the first driving gearwheel, the number of gear teeth of the first gearwheel can be either reduced or increased with at least one gear tooth, without affecting the number of gear teeth on the first driving gearwheel, whereby the reduction or increase in the number of gear teeth of the first gearwheel is compensated with a profile shift of the gear teeth of the first gearwheel.

2. The transmission according to claim 1 wherein the first and second countershafts have first and second rotational axes, respectively, that are arranged at first and second predetermined distances, respectively, from a rotational axis of the input shaft.

3. The transmission according to claim 1 wherein a number of gear teeth on the first output gearwheel is selected such that, in relation to a number of gear teeth on the final drive gearwheel, the number of gear teeth of the first output gearwheel can be reduced or increased with at least one gear tooth without affecting the number of gear teeth on the final drive gearwheel, whereby the reduction or increase of the number of gear teeth of the first output gearwheel is compensated with a profile shift of the gear teeth of the first output gearwheel.

4. The transmission according to claim 1 wherein a number of gear teeth on the second gearwheel is selected such that, in relation to the number of gear teeth on the first driving gearwheel, the number of gear teeth of the second gearwheel can be reduced or increased with at least one gear tooth without affecting the number of gear teeth on the first driving gearwheel, whereby the reduction or increase of the number of gear teeth of the second gearwheel is compensated with a profile shift of the gear teeth of the second gearwheel.

5. The transmission according to claim 1 wherein a number of gear teeth on the second output gearwheel is selected such that, in relation to a number of gear teeth on the final drive gearwheel, the number of gear teeth of the second output gearwheel can be reduced or increased with at least one gear tooth without affecting the number of gear teeth on the final drive gearwheel, whereby the reduction or increase of the number of gear teeth of the second output gearwheel is compensated with a profile shift of the gear teeth of the second output gearwheel.

6. The transmission according to claim 1 wherein the input shaft is provided with at least one further driving gearwheel, which is in drive connection with at least one further gearwheel on the first countershaft.

7. The transmission according to claim 1 wherein the input shaft is provided with at least one further driving gearwheel, which is in drive connection with at least one further gearwheel on the second countershaft.

8. A transmission for a motor vehicle, the transmission comprising:
   an input shaft having a first driving gearwheel;
   a first countershaft having a first gearwheel and a first output gearwheel;
   a second countershaft having a second gearwheel and a second output gearwheel; and
   an output shaft having a final drive gearwheel;
   wherein the first driving gearwheel is configured to interact with the first and second gearwheels, and the first and second output gearwheels are configured to interact with the final drive gearwheel, and wherein a number of gear teeth of the first gearwheel is selected such that, in relation to a number of gear teeth of the first driving gearwheel, the number of gear teeth of the first gearwheel can be either reduced or increased by at least one gear tooth, without affecting the number of gear teeth on the first driving gearwheel, whereby the reduction or increase in the number of gear teeth of the first gearwheel is compensated with a profile shift of the gear teeth of the first gearwheel.

9. The transmission according to claim 8 wherein the first and second countershafts have first and second rotational axes, respectively, that are arranged at first and second predetermined distances, respectively, from a rotational axis of the input shaft.

10. The transmission according to claim 8 wherein a number of gear teeth on the first output gearwheel is selected such that, in relation to a number of gear teeth on the final drive gearwheel, the number of gear teeth of the first output gearwheel can be reduced or increased with at least one gear tooth without affecting the number of gear teeth on the final drive gearwheel, whereby the reduction or increase in the number of gear teeth of the first output gearwheel is compensated with a profile shift of the gear teeth of the first output gearwheel.

11. The transmission according to claim 10 wherein a number of gear teeth on the second gearwheel is selected such that, in relation to the number of gear teeth on the first driving gearwheel, the number of gear teeth of the second gearwheel can be reduced or increased with at least one gear tooth without affecting the number of gear teeth on the first driving gearwheel, whereby the reduction or increase in the number of gear teeth of the second gearwheel is compensated with a profile shift of the gear teeth of the second gearwheel.

12. The transmission according to claim 8 wherein a number of gear teeth on the second gearwheel is selected such that, in relation to the number of gear teeth on the first driving gearwheel, the number of gear teeth of the second gearwheel can be reduced or increased with at least one gear tooth without affecting the number of gear teeth on the first driving gearwheel, whereby the reduction or increase in the number of gear teeth of the second gearwheel is compensated with a profile shift of the gear teeth of the second gearwheel.

13. The transmission according to claim 11 wherein a number of gear teeth on the second output gearwheel is selected such that, in relation to the number of gear teeth on the final drive gearwheel, the number of gear teeth of the second output gearwheel can be reduced or increased with at least one gear tooth without affecting the number of gear teeth on the final drive gearwheel, whereby the reduction or increase in the number of gear teeth of the second output gearwheel is compensated with a profile shift of the gear teeth of the second output gearwheel.

14. The transmission according to claim 8 wherein a number of gear teeth on the second output gearwheel is selected such that, in relation to a number of gear teeth on the final drive gearwheel, the number of gear teeth of the second output gearwheel can be reduced or increased with at least one gear tooth without affecting the number of gear teeth on the final drive gearwheel, whereby the reduction or increase in the number of gear teeth of the second output gearwheel is compensated with a profile shift of the gear teeth of the second output gearwheel.

15. The transmission according to claim 13 wherein the input shaft is provided with at least one further driving gearwheel, which is in drive connection with at least one further gearwheel on the first countershaft.

16. The transmission according to claim 8 wherein the input shaft is provided with at least one further driving gearwheel, which is in drive connection with at least one further gearwheel on the first countershaft.

17. The transmission according to claim 13 wherein the input shaft is provided with at least one further driving gearwheel, which is in drive connection with at least one further gearwheel on the second countershaft.

18. The transmission according to claim 8 wherein the input shaft is provided with at least one further driving gearwheel, which is in drive connection with at least one further gearwheel on the second countershaft.

* * * * *